US010277670B2

(12) United States Patent
Corley et al.

(10) Patent No.: US 10,277,670 B2
(45) Date of Patent: *Apr. 30, 2019

(54) SECURING CONTENT USING PIPELINES

(71) Applicant: Amazon Technologies, Inc., Reno, NV (US)

(72) Inventors: Jonathan B. Corley, Seattle, WA (US); David Idris Alexander Sayed, Bellevue, WA (US); Christopher Neil Hawes, San Francisco, CA (US); Bradley Eugene Marshall, Bainbridge Island, WA (US); James J. Carrig, San Jose, CA (US); Jeffrey Paul Ramsden, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,626

(22) Filed: Oct. 13, 2017

(65) Prior Publication Data

US 2018/0131752 A1 May 10, 2018

Related U.S. Application Data

(63) Continuation of application No. 14/462,425, filed on Aug. 18, 2014, now Pat. No. 9,794,328, which is a
(Continued)

(51) Int. Cl.
*H04L 29/08* (2006.01)
*G06F 21/62* (2013.01)
(Continued)

(52) U.S. Cl.
CPC .............. *H04L 67/10* (2013.01); *G06F 21/10* (2013.01); *G06F 21/62* (2013.01); *H04N 19/395* (2014.11); *H04N 19/40* (2014.11); *H04N 19/436* (2014.11)

(58) Field of Classification Search
CPC ................. G06F 21/10; G06F 21/6218; G11B 20/00086
(Continued)

(56) References Cited

U.S. PATENT DOCUMENTS 6,407,680 B1 * 6/2002 Lai ..................... H04N 7/17318
341/50
7,155,475 B2 12/2006 Agnoli et al.
(Continued)

OTHER PUBLICATIONS

"Notice of Allowance dated Apr. 25, 2014," U.S. Appl. No. 13/750,978, 8 pages.
(Continued)

Primary Examiner — Evans Desrosiers
(74) Attorney, Agent, or Firm — Hogan Lovells US LLP

(57) ABSTRACT

A transcoding service is described that is capable of transcoding or otherwise processing content, such as video, audio or multimedia content, by utilizing one or more pipelines. A pipeline can enable a user to submit transcoding jobs (or other processing jobs) into an available pipeline, where a transcoding service (or other such service) assigns one or more computing resources to process the jobs received to each pipeline. The transcoding service and the pipelines can be provided by at least one service provider (e.g., a cloud computing provider) or other such entity to a plurality of customers. A service provider can also provide the computing resources (e.g., servers, virtual machines, etc.) used to process the transcoding jobs from the pipelines.

21 Claims, 9 Drawing Sheets

Related U.S. Application Data continuation of application No. 13/750,978, filed on Jan. 25, 2013, now Pat. No. 8,813,245.

(51) Int. Cl.
  *G06F 21/10* (2013.01)
  *H04N 19/40* (2014.01)
  *H04N 19/30* (2014.01)
  *H04N 19/436* (2014.01)

(58) Field of Classification Search
  USPC .......................................................... 726/27
  See application file for complete search history.

(56) References Cited

U.S. PATENT DOCUMENTS

| | | | |
|---|---|---|---|
| 7,305,040 B1 | 12/2007 | Yoshinari et al. | |
| 7,379,966 B2 | 5/2008 | Agnoli et al. | |
| 7,454,754 B2 | 11/2008 | Tajima | |
| 7,478,166 B2 | 1/2009 | Agnoli et al. | |
| 7,962,640 B2 | 6/2011 | Lee | |
| 8,045,469 B2 | 10/2011 | Nagy et al. | |
| 8,326,912 B2 | 12/2012 | McGowan et al. | |
| 8,392,593 B1 | 3/2013 | Wadhwa et al. | |
| 8,752,112 B2 | 6/2014 | Krasic et al. | |
| 8,813,245 B1 | 8/2014 | Corley | |
| 8,832,751 B2 | 9/2014 | Noh et al. | |
| 8,832,759 B2 | 9/2014 | Ji et al. | |
| 8,862,733 B2 * | 10/2014 | Lemus | H04N 19/162 709/225 |
| 8,886,015 B2 | 11/2014 | Angquist et al. | |
| 9,183,049 B1 | 11/2015 | Corley | |
| 9,223,621 B1 | 12/2015 | Corley | |
| 2005/0013495 A1 | 1/2005 | Yoshigahara | |
| 2005/0195975 A1 | 9/2005 | Kawakita | |
| 2008/0270569 A1 | 10/2008 | McBride et al. | |
| 2009/0007274 A1 | 1/2009 | Martinez et al. | |
| 2009/0024730 A1 | 1/2009 | Wu | |
| 2009/0119322 A1 | 5/2009 | Mills et al. | |
| 2009/0328048 A1 | 12/2009 | Khan et al. | |
| 2010/0058352 A1 | 3/2010 | Esfahany et al. | |
| 2011/0239251 A1 | 9/2011 | Miller | |
| 2011/0286037 A1 | 11/2011 | Hamada | |
| 2012/0030376 A1 | 2/2012 | Lemus et al. | |
| 2012/0207449 A1 | 8/2012 | Angquist et al. | |
| 2013/0151493 A1 | 6/2013 | Roth et al. | |
| 2013/0239115 A1 | 9/2013 | Kato | |
| 2013/0332574 A1 | 12/2013 | Lin et al. | |
| 2014/0007256 A1 * | 1/2014 | Shah | H04N 21/2541 726/27 |
| 2014/0025837 A1 | 1/2014 | Swenson et al. | |
| 2014/0047261 A1 | 2/2014 | Patiejunas et al. | |
| 2014/0089936 A1 | 3/2014 | Takano | |
| 2014/0115050 A1 | 4/2014 | Liu et al. | |
| 2014/0173596 A1 | 6/2014 | Ng et al. | |
| 2014/0344415 A1 | 11/2014 | Liu et al. | |

OTHER PUBLICATIONS

"Notice of Allowance dated Jun. 26, 2014," U.S. Appl. No. 13/750,978, 6 pages.

"Non Final Office Acted dated Nov. 30, 2015" received in U.S. Appl. No. 14/462,425.

"Final Office Acted dated Jun. 9, 2016" received in U.S. Appl. No. 14/462,425.

"Notice of Allowance dated Jun. 26, 2017" received in U.S. Appl. No. 14/462,425.

"Non Final Office Acted dated Dec. 10, 2014" received in U.S. Appl. No. 13/750,965.

"Notice of Allowance dated May 26, 2015" received in U.S. Appl. No. 13/750,965.

"Notice of Allowance dated Jul. 9, 2015" received in U.S. Appl. No. 13/750,965.

"Non Final Office Acted dated Jan. 29, 2015" received in U.S. Appl. No. 13/750,985.

"Notice of Allowance dated Aug. 14, 2015" received in U.S. Appl. No. 13/750,985.

Savant et al. "On the Scalability of an Image Transcoding Proxy Server", 2003 IEEE, pp. 209-212.

Hossain et al. "QoS Requirement in the Multimedia Transcoding Service Selection Process", 2009 IEEE, pp. 1498-1506.

\* cited by examiner

SECURING CONTENT USING PIPELINES

CROSS REFERENCE TO RELATED APPLICATION

This application is a Continuation of U.S. patent application Ser. No. 14/462,425 filed with the U.S. Patent and Trademark Office on Aug. 18, 2014, which is a Continuation of, and accordingly claims the benefit of Ser. No. 13/750,978, now U.S. Pat. No. 8,813,245, filed Jan. 25, 2013, both of which are hereby incorporated herein by reference.

BACKGROUND

In recent years, there has been a surge of development and releases of new types of mobile devices made available to the public. Today's consumer is often equipped with a smart phone, tablet, portable media player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to produce a version of each asset to accommodate some or all of these variants.

BRIEF DESCRIPTION OF THE DRAWINGS

Various embodiments in accordance with the present disclosure will be described with reference to the drawings, in which.

DETAILED DESCRIPTION

Figure 1:
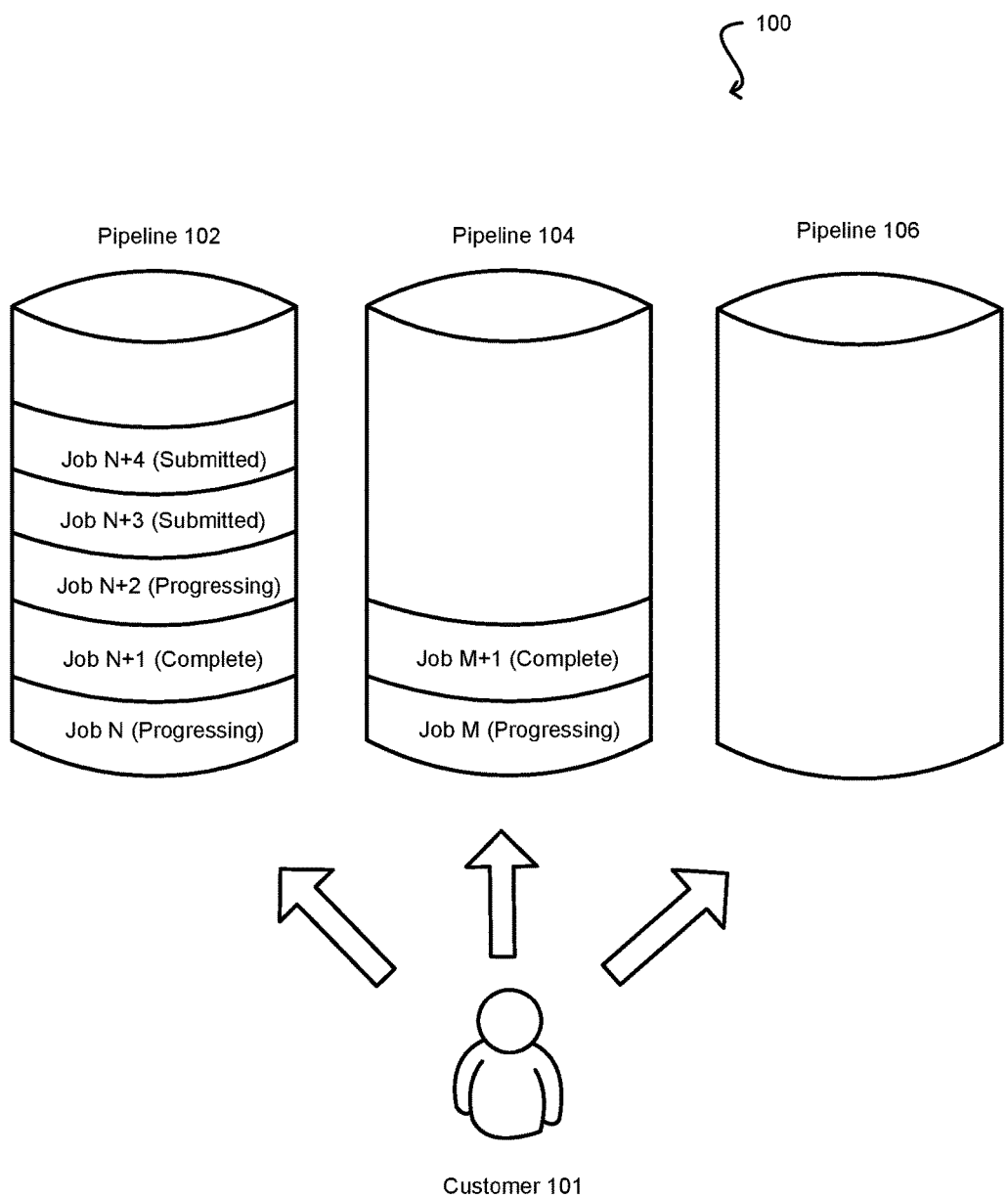
FIG. 1 illustrates an example of using pipelines for scheduling transcoding jobs, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing content, such as digital media. In particular, the various embodiments provide approaches for transcoding or otherwise processing content, such as video, audio or multimedia content, by utilizing one or more pipelines. A pipeline can enable a user to submit transcoding jobs (or other processing jobs), where a transcoding service (or other such service) assigns one or more computing resources to process the jobs received to each pipeline. The transcoding service and the pipelines can be provided by at least one service provider (e.g., a cloud computing provider) or other such entity to a plurality of customers. A service provider can also provide the computing resources (e.g., servers, virtual machines, etc.) used to process the transcoding jobs from the pipelines.

In various embodiments, a pipeline can be any data structure capable of storing and managing jobs (e.g., transcoding jobs) submitted by a user to the transcoding service. A transcoding job can connect an input store (or other location) containing the content (e.g., media file) to be processed with an output store where the processed content (e.g., resulting transcoded file) will be stored, at least temporarily. Jobs are processed from each pipeline sequentially, in the order in which they were received to the pipeline. A pipeline can allow multiple jobs (e.g., transcoding jobs) to be processed simultaneously by the various computing resources. In some embodiments, a pipeline may have a width associated therewith, where the width specifies a value such as the maximum number of concurrent jobs that can be processed by the pipeline at any given time. Because the jobs submitted to the pipeline may vary in size or length (e.g., minutes of video), the jobs may often be finished out of the sequential order (e.g., in a different order from the order in which they were submitted to the pipeline).

In accordance with one embodiment, the customers of the service provider can use the pipelines to manage their transcoding jobs. For example, if a customer has one pipeline that is full with multiple jobs waiting to be processed, the customer may choose to schedule the next job (e.g., urgent job) to a different pipeline (e.g., empty pipeline) that is waiting for such urgent jobs. In this manner, the customer can manage how much work is submitted to each pipeline.

In accordance with another embodiment, the customers of the service provider can use the pipelines to control permissions and otherwise secure the transcoding of their content. For example, if the customer has multiple departments having need to transcode media content, the customer may specify which users or groups of users (e.g., departments)

have permissions to access which pipelines. In this manner, the users belonging to a particular department may be given permissions to access a higher priority pipeline if the content of that department is deemed more important to the customer.

In accordance with another embodiment, the customers of the service provider may use the pipelines to organize the transcoding of content by media type, by device target or based on other characteristics. The customer may associate one or more presets (e.g., groupings of transcoding settings and parameters) with each pipeline, where any transcoding jobs being submitted to the pipeline will have the presets applied to them. For example, the customer may choose to have the media content targeted for mobile phones and tablet computers going through one pipeline, while media content targeted for television devices is going to a different pipeline. Alternatively, the customer may choose to have their social media content going through different pipelines than their premium content. In either event, the customer may specify (e.g., via an API call) that a pipeline should have a particular preset associated with the pipeline, such that whenever a transcoding job is submitted to that pipeline, the transcoding job will utilize the particular parameters of that preset to transcode the content.

FIG. 1 illustrates an example 100 of using pipelines for scheduling transcoding jobs, in accordance with various embodiments. As illustrated, a transcoding service may provide to the customer 101 one or more pipelines (102, 104, 106) that can be used to manage the scheduling of various transcoding jobs of the customer. A pipeline can be any data structure (e.g., queue) that can be used to store and manage transcoding jobs being submitted to the transcoding service. There may be multiple pipelines corresponding to a single customer account. When submitting a transcoding job to the transcoding service, the customer 101 (e.g., authorized user under the account) can use an application programming interface (API) to select one of the pipelines and to submit the transcoding job to that pipeline. Once the job is submitted, the pipeline will store the job until the job is started. A pipeline functions similarly to a job queue in the sense that the first job submitted to the pipeline will be the first job to begin. However, multiple transcoding jobs may be processed simultaneously from a single pipeline at any given time. In some embodiments, the pipeline has a maximum width that specifies the maximum number of concurrent transcoding jobs that are being processed in the pipeline. All remaining jobs in the pipeline are scheduled to wait to be processed. Because transcoding jobs vary in the number of minutes of video (or the size of the file), it will be common for various transcoding jobs to finish in a different order than the order in which the jobs were started. As such, while jobs are started in the order that they are received to the pipeline, in many cases, the pipelines will not utilize strict First in, First out (FIFO) prioritization because the first jobs submitted to the pipeline will not always finish first.

In various embodiments, a user may create a transcoding job by invoking an API call of the transcoding service. A transcoding job can connect an input store (or other content source), an output store (or other such repository), a preset (e.g., transcoding parameters) and an option to be notified about the job progress (e.g., when the job is processing, completed, etc.). The input store contains the content to be transcoded (or otherwise processed) by the transcoding job and the output store is the designated location into which the transcoded content will be placed once the transcoding job is completed. The input store and the output store can be any location capable of storing content, such as a directory, database, file system, network accessible storage location or the like. In some embodiments, the input store and the output store can be in the same location.

As previously mentioned, to schedule a new transcoding job, the customer 101 may enter a new job into the system, select a pipeline out of the plurality of pipelines (102, 104, 106), and invoke a request to submit the new transcoding job to the pipeline. For example, to select the pipeline, the customer may invoke an API call, passing the pipeline identifier (ID) as a parameter to the API call. In addition to specifying the pipeline, the API request may also specify a preset (i.e., a profile) to be used with the transcoding job. In one embodiment, a preset (i.e., profile) is a re-usable set of transcoding parameters that are designed to support on or more classes of devices. The preset can be provided by the transcoding service. Some presets can be generic (e.g., applicable to multiple device types), while other presets are optimized for a specific device type. For example, a "Generic 1080P" preset may contain the transcoding parameters and settings to transcode a media file into a format in 1080P definition that is viewable on multiple types of devices. Similarly, an "iPhone 4S" preset may contain the transcoding parameters and settings to transcode the media file into a format viewable on an iPhone of model 4S. In various embodiments, numerous other presets can be provided by the transcoding service.

Once the new job has been submitted (e.g., using the API) to the pipeline, the new transcoding job will be scheduled to begin in the sequential order that it was received in the pipeline, while still maintaining the number of concurrently executing jobs within the maximum allowed limit. Thus, if there are no transcoding jobs executing in the pipeline at the time of submitting the new job, the new job can begin to be processed immediately. Similarly, if the pipeline's width allows for additional concurrent jobs, the new job can be started immediately. However, if the pipeline is already executing the maximum allowed number of concurrent jobs (e.g., specified by the width of the pipeline), the new transcoding job will be queued to begin in the order that it was received.

In the illustrated embodiment, pipeline 102 includes five transcoding jobs that have been submitted to the pipeline 102 in the order starting from the bottom to the top. More specifically, Job N was the first job submitted to the pipeline 102 and Job N is currently processing. Job N+1 was the next job submitted and this job is now complete, as indicated in the figure. Job N+2 was the next job submitted and it is currently being processed. In the illustrated embodiment, the pipeline 102 has a corresponding width of 2, i.e., the maximum number of jobs that can be simultaneously executed from the queue. Jobs N+3 and N+4 were submitted and are currently waiting to begin in the sequential order that they were received. Similarly, pipeline 104 has two jobs that have been submitted to it by the customer, where Job M is currently in progress and Job M+1 is complete. Pipeline 106 is empty and ready to begin any job submitted to it.

In accordance with one embodiment, all pipelines can be equal from the service point of view in terms of resources assigned to the pipeline, but the customer may choose to designate the pipelines differently to fill different needs. For example, a customer may submit low priority jobs to one pipeline and reserve a second empty pipeline for getting high priority jobs through the system quickly. As an illustration, the customer 101 may reserve pipeline 106 for urgent or other high priority transcoding jobs, while pipeline 102 may be used for all low priority transcoding jobs.

In various embodiments, to process the jobs from the pipelines (102, 104, 106) the service assigns one or more computing resources that are capable of processing the transcoding jobs. The computing resources can include any resource capable of being used to transcode or otherwise process content, such as a physical server device, virtual machine, a specified amount of computing capacity, or the like. When the transcoding job is started from a pipeline, the one or more computing resources that have been assigned to the transcoding job begin transcoding the content stored in the input store corresponding to the pipeline. Once the transcoding is complete, the transcoded content can be stored in the output store corresponding to the pipeline. In some embodiments, the pipeline may issue a notification to the customer whenever the transcoding job is completed.

In various embodiments, pipelines can be used by the customer as a way to obtain more or less parallelism. For example, each pipeline can be allocated a default portion of all computing resources by the transcoding service. If the customer wishes to obtain access to more computing resources or more transcoding capacity, the customer may create an additional pipeline, such as by invoking an API call to the transcoding service. In other embodiments, the customer may be allowed to increase the maximum width of a particular pipeline.

In various embodiments, the term "transcoding" can refer to any transforming of the content from a first media format into a second media format or otherwise processing content as described herein. Conventionally, transcoding refers to the decoding and recoding of digital content from one format to another. Transcoding is sometimes used to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding can come from the vast range of devices, networks, and channels that may need to be supported. As used throughout this disclosure, the terms "transcode" and "transcoding" should be broadly construed and are not limited to any particular formats, bit rates, media types or device types. Furthermore, transcoding is not limited to changing the encoding format of media and, in some embodiments, may not include changing the encoding format at all. For example, in some cases, transcoding the content may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one job submitted to a pipeline could include segmenting a video file for multi-bitrate support and adding audio to the video file and another job could include digital watermarking and applying access controls to the file.

Figure 2:
FIG. 2 illustrates an example of scheduling transcoding jobs submitted to various pipelines, in accordance with various embodiments.

FIG. 2 illustrates an example 200 of scheduling transcoding jobs submitted to various pipelines, in accordance with various embodiments. The scheduling model shown in FIG. 2 illustrates multiple customers (210, 212, 214) with multiple pipelines (202, 204, 206, 208), where each pipeline is processing multiple transcoding jobs. As previously mentioned, each pipeline may be associated with a maximum width W that limits the number of concurrently executing jobs in that pipeline. In one embodiment, the pipelines can be allocated enough computing resources such that each pipeline is capable of operating to simultaneously process W jobs at a designated rate. The customers may be allowed to create pipelines up to a default account limit. For purposes of illustration, in FIG. 2 the width value of W=2 is associated with each pipeline, i.e. each pipeline may be processing up to 2 jobs simultaneously at any given time. However, in other embodiments, the width assigned to a pipeline can be any arbitrary number so long as enough computing resources exist to support it.

In the illustrated embodiment, transcoding jobs (220, 222, 224, 226, 228, 230) have been submitted by customers 210, 212 and 214. The transcoding service pulls the transcoding jobs from the pipelines (202, 204, 206, 208) and schedules them to be processed by the computing resources (232, 234, 236). As previously mentioned, the computing resources (232, 234, 236) can include but are not limited to physical servers, virtual machines or other units of computing capacity. In this particular example, there are three pipelines that have transcoding jobs and the width of each pipeline is 2 (meaning that the maximum number of transcoding jobs that can be concurrently executed is 2). As such, the service is capable of allocating enough computing resources to ensure that the total of 6 jobs can be executed at once. As illustrated in the figure, if a sudden burst of activity causes a shortage of computing resources, transcoding jobs may back up in a scheduling queue in the order in which they were entitled to processing (e.g., order in which they were received). These scheduled jobs (226, 228, 230) will be started in the order received. Thus, in this example, the transcoding service will allocate three additional computing resources (not shown) to process the scheduled jobs (226, 228, 230) waiting in the pipelines.

The computing resources assigned to the various pipelines can be scaled according to the load of incoming transcoding jobs. As the load of incoming jobs rises, new computing resources can be added or provisioned to handle the additional load. When the load decreases, those computing resources may be de-allocated from processing jobs from the pipelines. In one embodiment, each pipeline may be associated with a maximum amount of computing resources. Each pipeline can be operated at the lesser of this maximum or the number of incomplete jobs in that pipeline. In this embodiment, to determine the total amount of needed computing resources, this requirement can be added up across all pipelines. Furthermore, it may be advantageous to maintain a buffer of resources to handle new requests quickly. The size of that buffer can grow with the number of currently needed computing resources. Furthermore, hysteresis and delay can be added to the system to avoid over-reacting to short-lived stimuli.

In one embodiment, to control the scaling of the computing resources, a minimum and maximum utilizations (e.g., $U_{min}$ and $U_{max}$) can be defined as a function of the number of needed computing resources. In this embodiment, the resources are scaled when those boundaries are crossed. That is, computing resources can be added when utilization is greater than $U_{max}$ and computing resources can be de-allocated when the achieved utilization falls below $U_{min}$. To further guard against thrashing, a computing resource should not be de-allocated if it has been running less than a predetermined time interval (e.g., 45 minutes).

Figure 3:
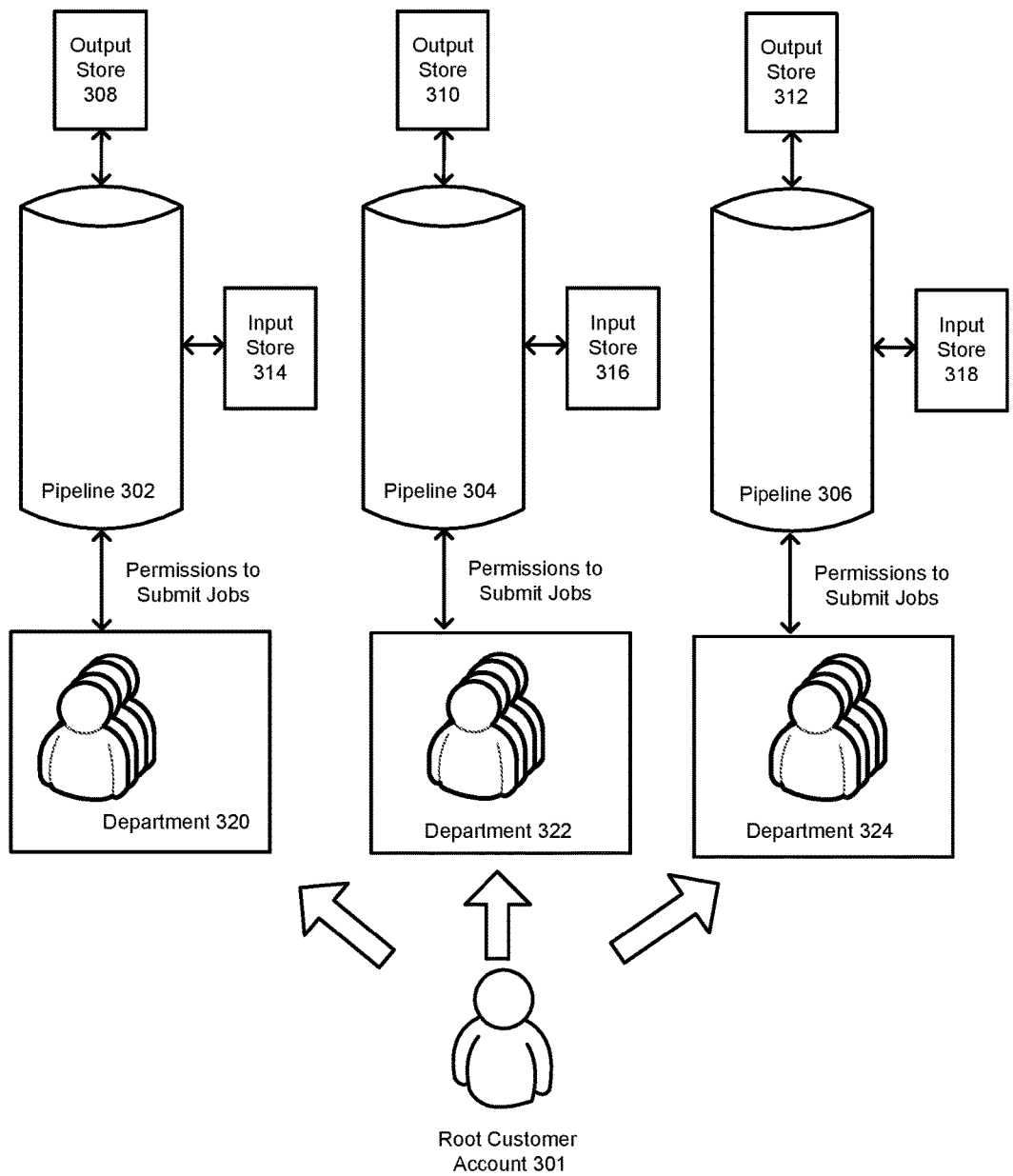
FIG. 3 illustrates an example of securing content and using permissions associated with pipelines, in accordance with various embodiments.

FIG. 3 illustrates an example 300 of securing content and using permissions associated with pipelines, in accordance with various embodiments. In the illustrated embodiment, a customer 301 that has signed up to use the transcoding service may have multiple departments (320, 322, 324) having the need to transcode digital media. Each department may have a plurality of users that have been granted to submit transcoding jobs to the transcoding service.

In various embodiments, the customer 301 (e.g., privileged user have administrator access) can specify which user has permissions to which pipelines (302, 304, 306). For example, as illustrated in FIG. 3, the customer 301 may grant users in department 320 access to submit transcoding jobs to pipeline 302, while users in departments 322 and 324 may be granted access to submit transcoding jobs to pipeline 304 and 306 respectively. In this embodiment, the users from department 322 would not be allowed to submit transcoding jobs to pipelines 302 and 306.

In accordance with an embodiment, a pipeline is assigned permissions at least one content store (e.g., an input store and/or an output store) instead of the customers department. For example, pipeline 302 is assigned permissions to input store 314 and output store 308, while pipeline 304 is assigned permission to input store 316 and output store 310 and pipeline 306 is assigned permissions to input store 318 and output store 312. The permissions can be assigned to the pipelines by the customer 301 or by some other authorized user. In one embodiment, the permissions assigned to the pipeline include read and write permissions to any file stored in the particular content store.

Once the permissions have been assigned, when a request to submit a transcoding job to the pipeline is received from a user, the transcoding service can first determine whether the user has been granted permissions to the pipeline. If the user has not been granted permissions to submit transcoding jobs to this pipeline, the request may be denied. Furthermore, the transcoding service may also determine whether the pipeline has been granted permissions to access the content store that contains the content specified by the transcoding job. If the pipeline has not been granted permissions to access the content, the request to submit the transcoding job can be denied. If both the pipeline and the user have been granted appropriate permissions, the transcoding job can be scheduled in the pipeline in the sequential order received, as previously described.

In various embodiments, the assignment of permissions in this manner creates an environment which can allow a user to invoke a transcoding job while never having access to either the input store or the output store (which are controlled by the root account). For example, the users in department 320 can submit transcoding jobs to pipeline 302, where those transcoding jobs will transcode content stored in input store 314, however the users in department 320 may not have permissions to actually read or write content directly to input store 314. This may be important in situations where the content is highly sensitive, such as in the case of movies that are waiting to be released and it is desirable to keep the content from being leaked. The split of permissions in this manner would enable the users belonging to department 320 to initiate all the transcoding jobs and have the transcoded versions of content ready for release, all without granting access to those users to copy or disseminate the content.

A further effect of assigning permissions in this manner is that each pipeline could have access to different content stores, thereby allowing the customer 301 (e.g., root account) to control the number of concurrent jobs any user can process concurrently (by how many pipelines the user is granted access to) and which content stores a user can process to and from (by controlling which content stores the pipeline has access to).

As previously mentioned, the customer 301 can set the permissions needed for both the pipelines and the users so that the customer is aware of the access that is being given to the transcoding service. In one embodiment, the customer 301 can establish a role that a computing resource of the transcoding service can use for its access. The computing resource can obtain a session token to perform the transcoding work as necessary. In one embodiment, the computing resource will request a minimal permission (e.g., read/write permission) session regardless of the permissions granted to the role. If the role created by the customer does not grant the computing resource minimum access, the request to submit the transcoding job may fail (e.g., be denied).

Figure 4:
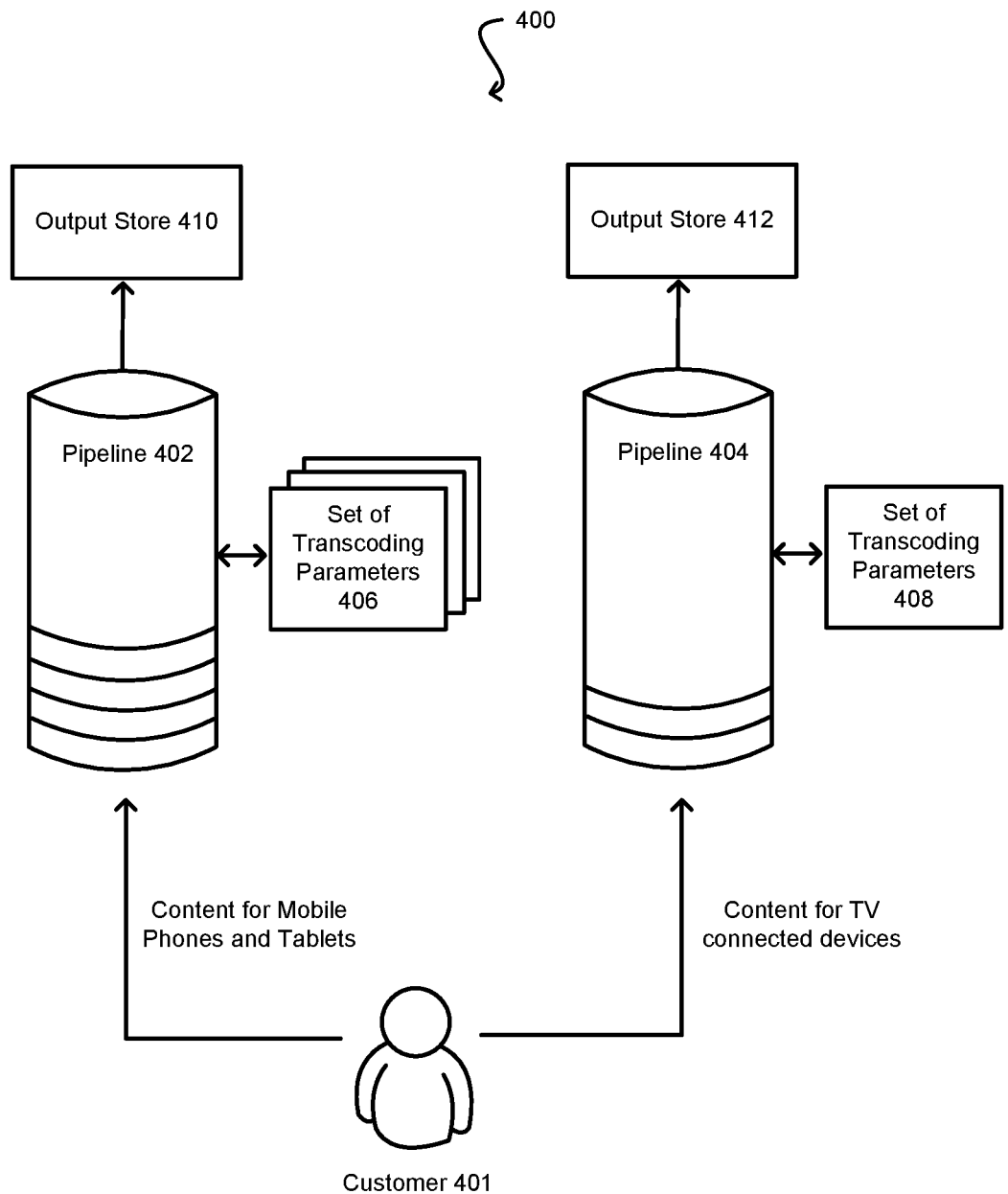
FIG. 4 illustrates an example of using pipelines to organize transcoding of content by media type or device type, in accordance with various embodiments.

FIG. 4 illustrates an example 400 of using pipelines to organize transcoding of content by media type or device type, in accordance with various embodiments. As previously described a customer 401 may have a plurality of pipelines (402, 404) provided by the transcoding service. In the illustrated embodiment, the customer 401 can use the pipelines to organize transcoding jobs by media type or by device target. For example, to organize by media type, the customer may have their social media content transcoding jobs going through one pipeline (e.g., pipeline 402) while the premium content uses a different pipeline (e.g., pipeline 404). Similarly, to organize by device target, the customer may direct transcoding jobs for content targeted for mobile phones and tablet computers to one pipeline (e.g., pipeline 402), while content targeted for television connected devices may be processed using another pipeline (e.g., pipeline 404). Organizing content transcoding in this content makes it easier for the customer to diagnose problems if there is any problem with content output that occurred in the transcoding.

To organize content transcoding in this manner, the customer 401 (e.g., authorized user under the customer account) may specify one or more sets of parameters (e.g., groupings of transcoding settings) that should be assigned to each pipeline. In one embodiment, the customer may identify the parameters using an API call to the transcoding service. In some embodiments, the transcoding may provide a number of "preset" groups of parameters for specific device types, media types and the like. In those embodiments, the customer may simply select the particular groupings of parameters of interest to be associated with the pipeline.

When the transcoding service receives the API call, the transcoding service can associate each set of parameters with the specific pipeline, as indicated by the customer. Thereafter, when a user submits transcoding job to the pipeline, the service will apply those parameters when processing the transcoding job. For example, as illustrated in FIG. 4, the pipeline 402 is associated with parameters 406, whereas pipeline 404 is associated with parameters 408. In various embodiments, some pipelines may have multiple groupings of transcoding parameters associated therewith, while other pipelines may have one group of parameters or no parameters associated therewith. If the pipeline does not have any parameters associated with the pipeline, the transcoding job may need to identify the particular settings to be used in transcoding the content, or at least select a particular profile or preset of parameters provided by the transcoding service.

In various embodiments, the pipeline may also be associated with a workflow that is executed on any transcoding jobs submitted to the pipeline. The workflow may include any number of actions, including the actual transcoding of the content, adding digital rights management (DRM), adding watermarks or other security information, inserting advertisements, segmenting the file, translating the file into different languages, or the like. For example, the workflow may specify that the content be first transcoded into a number of different formats and then watermark information be added to each version of the transcoded content, all as a result of the job being scheduled to the pipeline.

Figure 5:
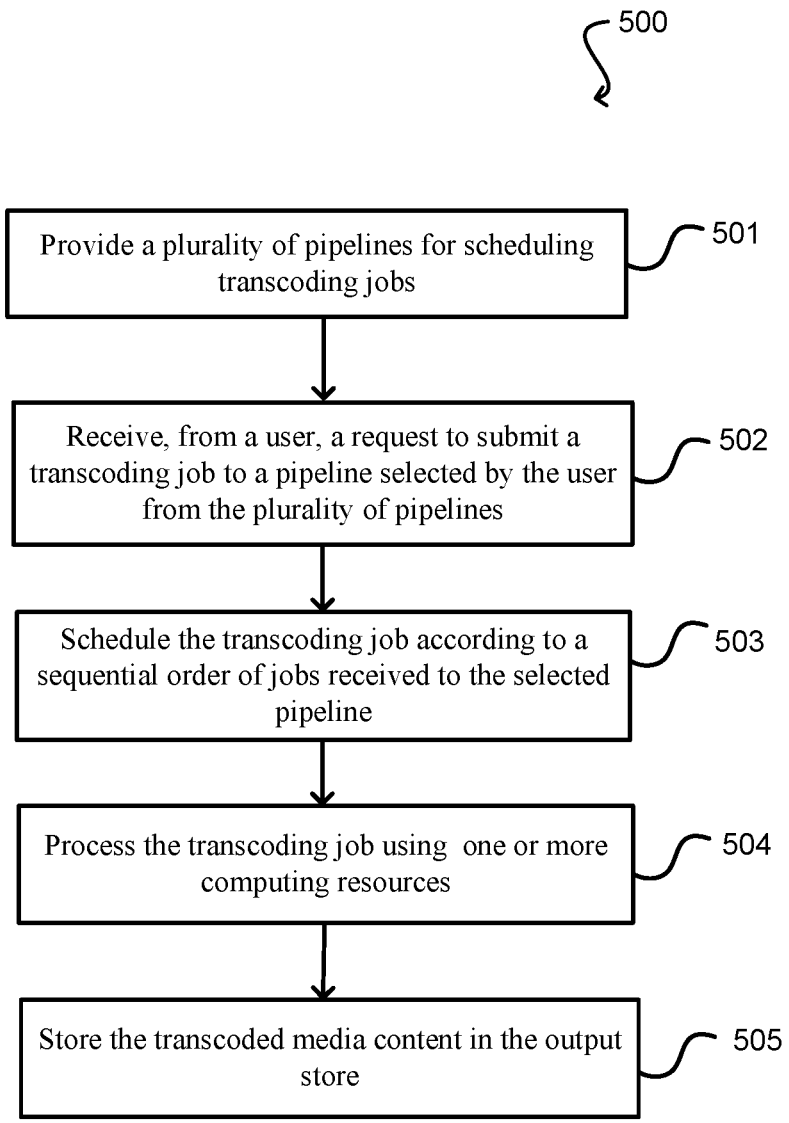
FIG. 5 illustrates an example of a process for utilizing pipelines to schedule transcoding jobs, in accordance with various embodiments.

FIG. 5 illustrates an example of a process 500 for utilizing pipelines to schedule transcoding jobs, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the transcoding service provides a plurality of pipelines that can be used for scheduling transcoding jobs. Each pipeline is assigned one or more computing resources operable to execute the transcoding jobs submitted to the pipeline. In one embodiment, each pipeline corresponds to a respective input store that contains the content to be transcoded and a respective output store into which the transcoded content will be stored.

In operation 502, the transcoding service receives, from a user, a request to submit a transcoding job to a pipeline. The pipeline is selected by the user from the plurality of pipelines provided by the service. In one embodiment, the request is submitted using an API call. The API call can specify the job, the pipeline and a preset (e.g., grouping of parameters).

In operation 503, the transcoding service schedules the new transcoding job in the selected pipeline according to the order of jobs received to the pipeline. For example, at the time of receiving the new transcoding job, the selected pipeline may already contain a plurality of other scheduled transcoding jobs waiting to be processed, where two or more transcoding jobs are being processed simultaneously.

In operation 504, the transcoding service may process the transcoding job in the pipeline using one or more computing resources. Transcoding the content may include transforming the content from one media format into a different media format. In some embodiments, the amount of computing resources assigned to process jobs from the various pipelines can be scaled up or down according to the load of transcoding jobs being received in all of the pipelines.

In operation 505, when the transcoding job is finished, the service may store the transcoded media content in the output store. In some embodiments, the output store may be a different location from the input store. In other embodiments, the output store may be the same location as the input store.

Figure 6:
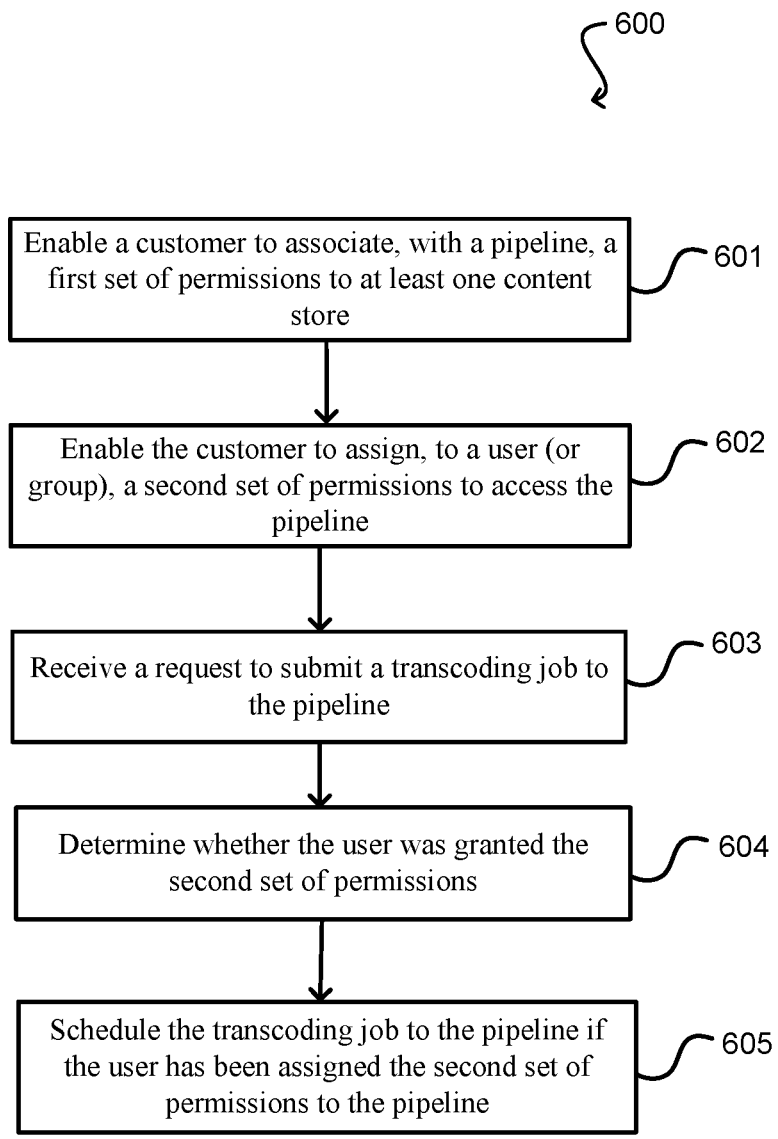
FIG. 6 illustrates an example of a process for securing content and using permissions associated with pipelines, in accordance with various embodiments.

FIG. 6 illustrates an example of a process 600 for securing content and using permissions associated with pipelines, in accordance with various embodiments. As illustrated in operation 601, the transcoding service enables a customer to associate a first set of permissions with a pipeline. This first set of permissions enables any transcoding job submitted to the pipeline to access (e.g., read and write) the content stored in the content store.

In operation 602, the transcoding service enables the customer to assign a second set of permissions to a user (or group of users). The second set of permissions enable the user (or group of users) to submit transcoding jobs to the pipeline.

In operation 603, the transcoding service receives a request from a user to submit a transcoding job to a pipeline. In step 604, the service can determine whether the user was granted the second set of permissions to the pipeline. If the user was granted the second set of permissions to the pipeline, the transcoding job is scheduled to the pipeline, as shown in operation 605. In some embodiments, the transcoding service may further check whether the pipeline has been granted the first set of permissions to access the content store specified by the transcoding job. If the pipeline has not been granted the permissions, the service may deny the job from being scheduled to the pipeline. In alternative embodiments, the service may still allow the transcoding job to be scheduled to the pipeline on the assumption that the pipeline will be granted the permissions to access the store in the near future.

Figure 7:
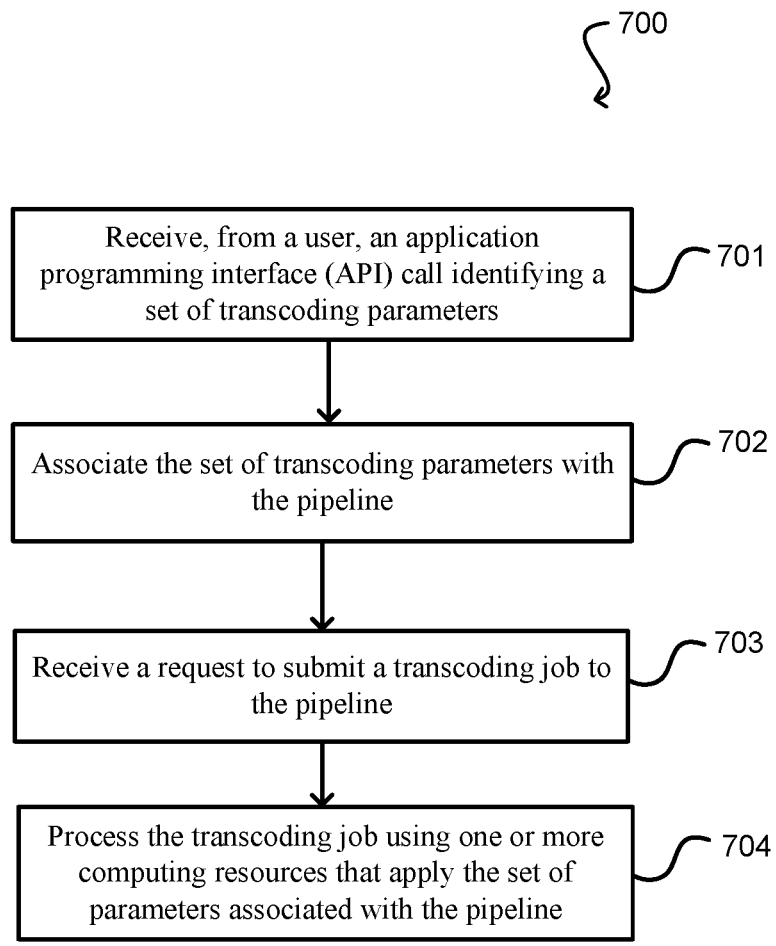
FIG. 7 illustrates an example of a process for using pipelines to organize transcoding of content by media type or device type, in accordance with various embodiments.

FIG. 7 illustrates an example of a process 700 for using pipelines to organize transcoding of content by media type or device type, in accordance with various embodiments. In operation 701, the transcoding service may receive, from a user, an application programming interface (API) call identifying a preset (e.g., a set of transcoding parameters) to be associated with a particular pipeline. As previously described, a preset (i.e., profile) is a re-usable set of transcoding parameters that are designed to support on or more classes of devices. The preset can be provided by the transcoding service. Some presets can be generic (e.g., applicable to multiple device types), while other presets are optimized for a specific device type.

In operation 702, in response to the request, the transcoding service may associate the preset with the specified pipeline. In operation 703, the service may receive a request to submit a transcoding job to the pipeline. As a result of associating the preset with the pipeline, the transcoding service will process the transcoding job using the set of parameters specified in the preset, as shown in operation 704. For example, when processing the transcoding job, the one or more computing resources will apply the set of parameters to the media content stored in the input store specified in the transcoding job.

Figure 8:
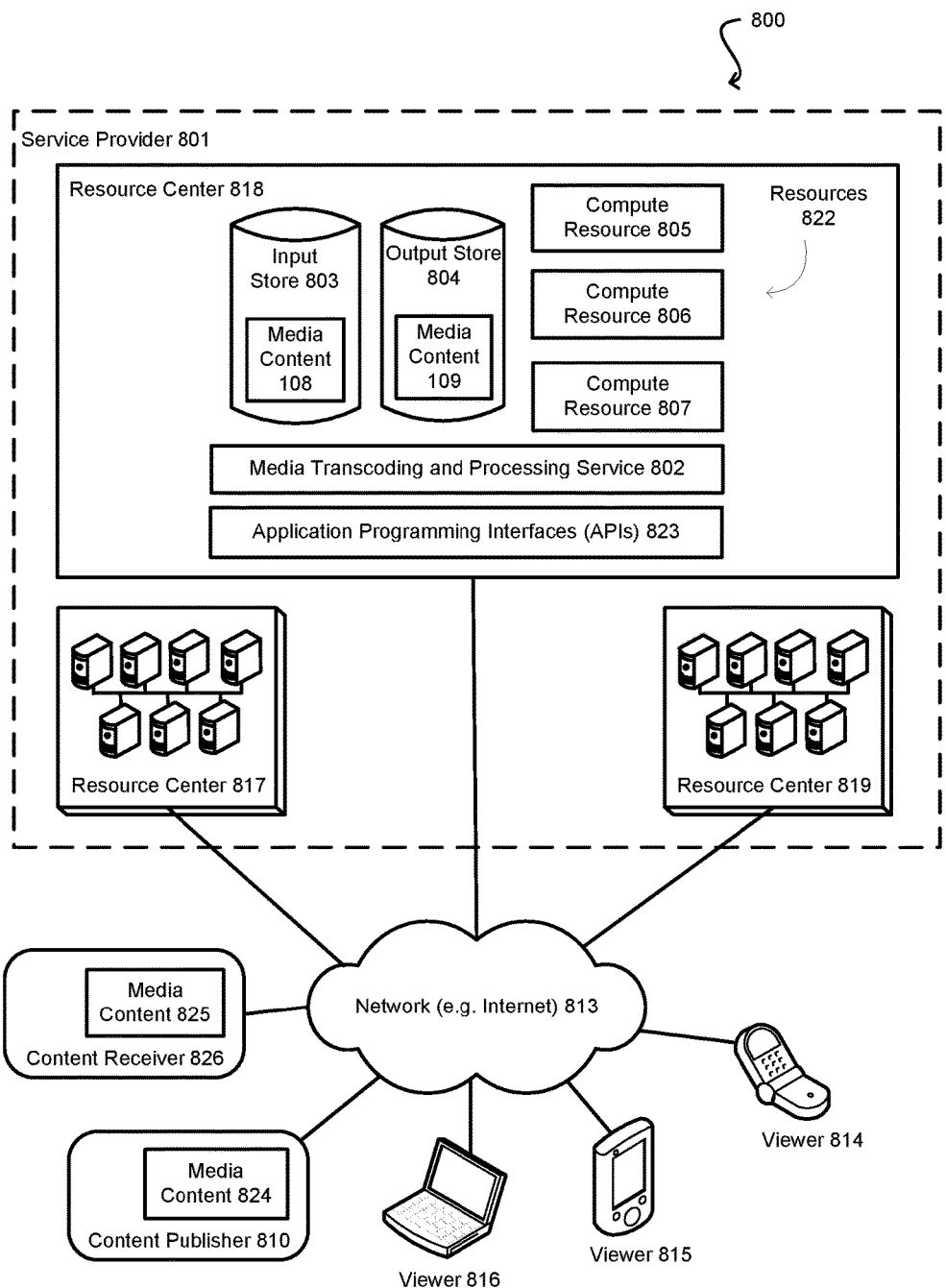
FIG. 8 is a general example of an environment in which the transcoding and other processing of media content can be implemented, in accordance with various embodiments.

FIG. 8 is a general example of an environment 800 in which the transcoding and other processing of media content can be implemented, in accordance with various embodiments. As illustrated, a service provider environment 801 can include a variety of devices and components for receiving and processing requests from various users across one or more networks 813. As discussed, access to these resources can be provided as one or more services, such as Web services. In this example, the service provider environment includes a plurality of resources 822, such as data storage resources and request processing resources, that can be deployed in one or more resource centers (817, 818, 819) in one or more locations and made accessible over the one or more networks 813. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 801 may include various computer servers, data storage machines, network devices and other hardware resources necessary to provide the network-accessible services on behalf of the clients of the service provider. For example, as shown in FIG. 8, the resource centers can include physical servers and other devices located in a particular geographical location, which enable the service provider to transcode, process and/or deliver media content to viewer devices (814, 815, 816). In accordance with an embodiment, a resource center can include media cache servers, transcoding servers, watermarking servers and the like. The view of one of the resource centers 818 is shown in an exploded view to provide further illustration of the types of resources 822 that can be contained in a resource center in accordance with various embodiments. It should be noted that the resources 822 can reside in one resource center or can alternatively be distributed across multiple resource centers.

In accordance with various embodiments, the service provider 801 offers a media transcoding and processing service 802 in addition to many other services discussed herein. In one embodiment, the media transcoding and processing service 802 can perform the transcoding jobs of media content 808, 809 stored in content stores (e.g. input store 803, output store 804) of the service provider 801. In alternative embodiments, the media transcoding and processing service 802 may perform various other functions, such as transmuxing the media, adding security information (e.g. watermarks) to the media, translating the media or adding subtitles and the like.

In accordance with an embodiment, components of the service provider environment 801 enable a content publisher 810 to provide (e.g. upload) a media file to an input store 803 and to schedule the transcoding jobs to be performed thereon. In various embodiments, the input store 803 may be located on the resource center of the service provider or on a remote system, such as the system of the content publisher 810. As an example, the content publisher 810 can upload content 824, such as a media file, to an input store 803 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 802 then carries out the workflow, including potentially transcoding the media content stored on an input store 803 into the appropriate encodings. Once workflow is complete, the resulting media content can be placed into an output store 804. The output store may be located on the resource center of the service provider or a remote system, such as the system of the content publisher 810 or other entity, such as the content receiver 826. As such, in this example, the media content located in the output store has had the workflow applied. From the output store 804, the media content can be made available to a content receiver 826 or the various viewer devices (814, 815, 816) for download. In alternative embodiments, the processed content could be made available to any other entities, including the content publisher 810 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (805, 806, 807) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 800 maintained by the service provider 801 and leased to its customers (e.g. content publisher 810).

It should be noted that while FIG. 8 illustrates an input store 803 and an output store 804 located in resource center 818, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 817 could be in Europe, the resource center 818 could be Asia, and the resource center 819 could be in the United States. In various embodiments, the various storage containers, servers, compute instances, transcoding services and other resources described herein could also reside on a single device.

In accordance with various embodiments, the transcoding service 802 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 801 to gain access to media transcoding and processing service. Once an account is created, media assets 808, 809, 824 (e.g. video files) to be transcoded are placed into an input store on the service provider. A workflow can be defined using an application programming interface (API) 823 or console, for example, to initiate a transcoding job which will be carried out using one or more of the compute resources (805, 806, 807). The resulting transcoded object(s) are placed into a defined output store 804 or some other specified location, such as a location on the system of the content publisher 810 or the content receiver 826. Alternatively, the transcoding service can cache the media assets at the network edge and perform the transcoding dynamically on a per-request basis depending on the type of requesting device.

In various embodiments, the media transcoding and processing service 802 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 810 (e.g., customer) may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 826 can be any entity that is provided with content 825 that has been transcoded or otherwise processed by the transcoding service. For example, the content receiver 826 may be a third party movie distributor that wishes to provide the transcoded video content on its own website.

In accordance with an embodiment, the service provider 801 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 801 may implement a number of pricing models for using the transcoding service. As one option, the pricing of transcoding service could be based on the usage of computing resources (805, 806, 807) that are utilized by the content publisher 810. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

In accordance with an embodiment, whenever content is placed in a location decided upon in advance by the content publisher and the service provider, the service provider could run a predetermined workflow. For example, the content publisher's needs could be to have a daily cable news program transcoded into formats for devices running Android® and Apple® IOS operating systems after the program airs each day, with advertisements and access controls applied to the media file. These needs can be expressed as a workflow conveyed to the service provider by way of an API or some other interface exposed to the content publisher. In one instance, the media input location could be on a server residing with the content publisher which the service provider has been granted access to. Therefore, each day, after the cable news program has aired, the service provider may automatically pull and transcode the file according the workflow conveyed by the content publisher. In another instance, the decided upon location could be a server residing with the service provider to where the content publisher uploads or pushes the file each day after the news program airs.

Figure 9:
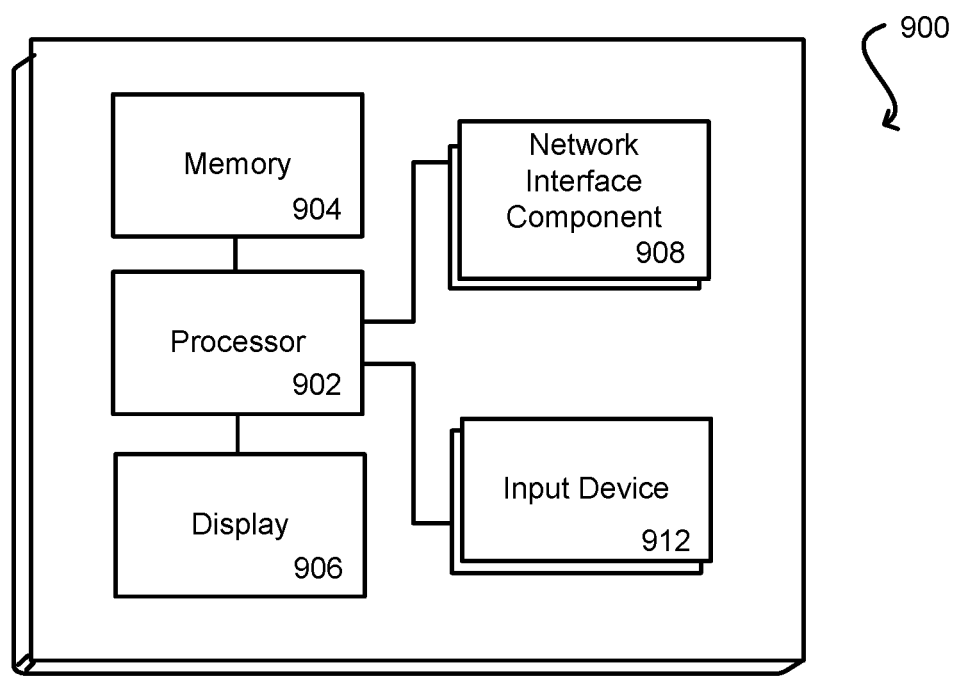
FIG. 9 illustrates a logical arrangement of a set of general components of an example computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method to process content, the method comprising:
providing a plurality of pipelines corresponding to a customer account to schedule transcoding jobs, the customer account associated with a plurality of users;
allowing a first set of permissions to be associated with a pipeline of the plurality of pipelines, the permissions granting the transcoding jobs in the pipeline access to content stored in the at least one content store;
allocating a portion of one or more computing resources to the pipeline to transcode the content stored in the at least one content store;
allowing a second set of permissions to be associated with a subset of the plurality of users, the second set of permissions allowing the subset of users to submit the transcoding jobs to the pipeline;
obtaining, from a user, a request to submit a transcoding job to the pipeline, the transcoding job corresponding to content stored in the content store;
determining whether the user has been granted the second set of permissions and whether the pipeline has been granted the first set of permissions;
scheduling the transcoding job to the pipeline in response to determining that the user has been granted the second set of permissions and that the pipeline has been granted the first set of permissions; and
modifying the portion of the one or more computing resources allocated to the pipeline based at least in part on the scheduling.

2. The computer implemented method of claim 1, wherein the portion of the one or more computing resources is a predetermined allocation of the one or more computing resources.

3. The computer implemented method of claim 1, wherein scheduling the transcoding job to the pipeline further comprises:
providing a session token to at least the portion of the one or more computing resources, the session token granting permissions to access the content stored in the at least one content store.

4. A computer implemented method, comprising:
allowing a first set of permissions to be associated with a pipeline of the plurality of pipelines, the permissions granting transcoding jobs in the pipeline access to content stored in at least one content store;
allocating a portion of one or more computing resources to the pipeline to transcode the content stored in the at least one content store;
allowing a second set of permissions to be associated with a subset of the plurality of users, the second set of permissions allowing the subset of users to submit the transcoding jobs to the pipeline;
controlling access to submitting the transcoding jobs in the pipeline based at least in part on the second set of permissions and the first set of permissions; and
modifying the portion of the one or more computing resources allocated to the pipeline based at least in part on controlling access to submitting the transcoding jobs.

5. The computer implemented method of claim 4, wherein controlling access to submitting the transcoding jobs to the pipeline further comprises:
obtaining, from a user, a request to submit a transcoding job to the pipeline;
determining that the user is granted the second set of permissions; and
allowing the user to submit the transcoding job to the pipeline.

6. The computer implemented method of claim 4, wherein the first set of permissions further comprises minimum read and write permissions to one or more media files stored in the at least one content store.

7. The computer implemented method of claim 5, wherein the plurality of pipelines is associated with a customer account, wherein the user is a privileged user in the customer account, and
wherein the user is enabled to assign the second set of permissions to a group of users, the group of users corresponding to a department of the customer account.

8. The computer implemented method of claim 5, wherein the user is granted the second set of permissions to submit the one or more transcoding jobs to the pipeline, and wherein the user is denied the first set of permissions to access the content stored in the at least one content store.

9. The computer implemented method of claim 4, wherein enabling the first set of permissions further comprises:
assigning the pipeline permissions to access content stored in an input store; and
assigning the pipeline permissions to write content to an output store.

10. The computer implemented method of claim 4, wherein the one or more transcoding jobs are processed from the pipeline by assigning one or more computing resource to transcode content stored in the at least one content store from a first format into a second format.

11. A computing device, comprising:
at least one processor; and
memory including instructions that, when executed by the at least one processor, cause the computing device to:
allow a first set of permissions to be associated with a pipeline of the plurality of pipelines, the permissions granting transcoding jobs in the pipeline access to content stored in at least one content store;

allocate a portion of one or more computing resources to the pipeline to transcode the content stored in the at least one content store;

allow a second set of permissions to be associated with a subset of the plurality of users, the second set of permissions allowing the subset of users to submit the transcoding jobs to the pipeline;

control access to submitting the transcoding jobs in the pipeline based at least in part on the second set of permissions and the first set of permissions; and modify the portion of the one or more computing resources allocated to the pipeline based at least in part on controlling access to submitting the transcoding jobs.

12. The computing device of claim 11, wherein the memory further includes instructions that, when executed by the at least one processor, cause the computing device to:

obtain, from a user, a request to submit a transcoding job to the pipeline;

determine that the user is granted the second set of permissions and whether the pipeline has been granted the first set of permissions;

allow the user to submit the transcoding job to the pipeline; and schedule the transcoding job to the pipeline in response to the user submitting the transcoding job.

13. The computing device of claim 11, wherein the portion of the one or more computing resources is a predetermined allocation of the one or more computing resources.

14. The computer implemented method of claim 12, wherein the memory further includes instructions that, when executed by the at least one processor, cause the computing device to:

provide a session token to at least the portion of the one or more computing resources, the session token granting permissions to access the content stored in the at least one content store.

15. The computing device of claim 12, wherein the plurality of pipelines is associated with a customer account, wherein the user is a privileged user in the customer account, and wherein the user is enabled to assign the second set of permissions to a group of users, the group of users corresponding to a department of the customer account.

16. The computing device of claim 11, wherein the memory further includes instructions that, when executed by the at least one processor, cause the computing device to:

assign the pipeline permissions to access content stored in an input store; and assign the pipeline permissions to write content to an output store.

17. A non-transitory computer readable storage medium storing one or more sequences of instructions executable by one or more processors to perform a set of operations comprising:

providing a plurality of pipelines corresponding to a customer account to schedule transcoding jobs, the customer account associated with a plurality of users;

enabling a first set of permissions to be associated with a pipeline of the plurality of pipelines, the permissions granting the transcoding jobs in the pipeline access to content stored in the at least one content store;

allocating a portion of one or more computing resources to the pipeline to transcode the content stored in the at least one content store;

allowing a second set of permissions to be associated with a subset of the plurality of users, the second set of permissions allowing the subset of users to submit the transcoding jobs to the pipeline;

obtaining, from a first user, a first request to submit a transcoding job to the pipeline, the transcoding job corresponding to content stored in the content store;

determining whether the first user has been granted the second set of permissions and whether the pipeline has been granted the first set of permissions;

scheduling the transcoding job to the pipeline in response to determining that the first user has been granted the second set of permissions and that the pipeline has been granted the first set of permissions; and modifying the portion of the one or more computing resources allocated to the pipeline based at least in part on the scheduling.

18. The non-transitory computer readable storage medium of claim 17, wherein the one or more sequences of instructions executable by the one or more processors to perform the set of operations further comprises:

obtaining, from a second user, a second request to submit a second transcoding job to the pipeline;

determining that the second user is granted the second set of permissions; and allowing the second user to submit the second transcoding job to the pipeline.

19. The non-transitory computer readable storage medium of claim 18, wherein the first set of permission further comprises minimum read and write permissions to one or more media files stored in the at least one content store, wherein the second user is granted the second set of permissions to submit the one or more transcoding jobs to the pipeline, and wherein the second user is denied the first set of permissions to access the content stored in the at least one content store.

20. The non-transitory computer readable storage medium of claim 17, wherein the one or more sequences of instructions executable by the one or more processors to perform the set of operations further comprises:

assigning the pipeline the first set of permissions to access content stored in an input store; and assigning the first set of pipeline permissions to write content to an output store.

21. The non-transitory computer readable storage medium of claim 17, wherein the plurality of pipelines is associated with a customer account, wherein the first user is a privileged user in the customer account, and wherein the first user is enabled to assign the second set of permissions to a group of users, the group of users corresponding to a department of the customer account.

* * * * *